(12) United States Patent
Jing et al.

(10) Patent No.: US 8,306,963 B2
(45) Date of Patent: Nov. 6, 2012

(54) EMBEDDED SEARCH BAR

(75) Inventors: Eric Jing, Beijing (CN); Vanessa Qianqian Guo, Beijing (CN); Jin Li, Beijing (CN); Javier Garcia Flynn, Seattle, WA (US); Quan Tang, Beijing (CN); Jill Shih, Beijing (CN)

(73) Assignee: Microsoft Corporation, Redmond, WA (US)

( * ) Notice: Subject to any disclaimer, the term of this patent is extended or adjusted under 35 U.S.C. 154(b) by 175 days.

(21) Appl. No.: 12/782,035

(22) Filed: May 18, 2010

(65) Prior Publication Data
US 2011/0289062 A1 Nov. 24, 2011

(51) Int. Cl.
G06F 7/00 (2006.01)
G06F 17/30 (2006.01)
G06F 3/00 (2006.01)
(52) U.S. Cl. .............. 707/706; 715/765; 719/328
(58) Field of Classification Search .......... None
See application file for complete search history.

(56) References Cited

U.S. PATENT DOCUMENTS

| | | |
|---|---|---|
| 7,171,384 B1 | 1/2007 | Fitzpatrick et al. |
| 2006/0106680 A1 | 5/2006 | Shafron et al. |
| 2007/0033269 A1 | 2/2007 | Atkinson et al. |
| 2008/0184129 A1 | 7/2008 | Cancel et al. |
| 2009/0144234 A1 | 6/2009 | Sharif et al. |
| 2009/0144723 A1 | 6/2009 | Hartin et al. |
| 2009/0150388 A1 | 6/2009 | Roseman et al. |
| 2009/0300547 A1* | 12/2009 | Bates et al. ............ 715/825 |
| 2011/0239140 A1* | 9/2011 | Chaudhri et al. .......... 715/760 |

FOREIGN PATENT DOCUMENTS

| | | |
|---|---|---|
| WO | 0055728 A1 | 9/2000 |
| WO | 0058841 A1 | 10/2000 |

OTHER PUBLICATIONS

"Google's Wave is Building off the Enterprise Shore", Retrieved at << http://www.kmworld.com/Articles/News/News-Analysis/Googlee28099s-Wave-is-building-off-the-enterprise-shore-55793.aspx >>, Aug. 28, 2009, pp. 4.

Manoochehri, Michael, "Microsoft Releases Bing API—With No Usage Quotas", Retrieved at << http://blog.programmableweb.com/2009/06/08/microsoft-releases-bing-api-with-no-usage-quotas/ >>, Jun. 8, 2009, pp. 4.

(Continued)

*Primary Examiner* — Uyen T. Le
(74) *Attorney, Agent, or Firm* — Capitol City TechLaw; Richard C. Irving

(57) ABSTRACT

Various embodiments provide an embedded search bar displayed on a display screen of a computing device. Executable code for the embedded search bar may be loaded by a browser from a remote source. The browser may execute the executable code, thereby causing the embedded search bar to be displayed at a fixed position of a display screen. The embedded search bar may be an open and extensible container for applications. The applications may be content-driven applications or utility applications, representations of which may be displayed within the embedded search bar. The applications may interact with the embedded search bar via a set of public application program interfaces. The applications may monitor search queries and may provide information to be displayed within the embedded search bar. The embedded search bar may further include a search window for entering a search query to be performed over a third-party website.

20 Claims, 8 Drawing Sheets

OTHER PUBLICATIONS

"Google Maps", Retrieved at << http://en.wikipedia.org/wiki/Google_Maps >>, Jan. 30, 2010, pp. 15.

"Microsoft Announces New Bing features & a New Bing Bar", Retrieved at << http://www.thewindowsclub.com/microsoft-announces-new-bing-features-a-new-bing-bar >>, Dec. 3, 2009, pp. 4.

Pendleton, Chris., "Bing Maps in Bing Toolbar and Accelerators", Retrieved at <<http://www.bing.com/community/blogs/maps/archive/2009/12/22/bing-maps-in-bing-toolbar-and-accelerators.aspx >>, Dec. 22, 2009, pp. 12.

Johnson, Nathania., "Keep the Wave Going: Bing Unveils Streetside Imaging for Maps, New Toolbar and More", Retrieved at << http://searchenginewatch.com/_subscribers/topics/&bname=maps >>, Dec. 2, 2009, pp. 3.

"International Search Report", Mailed Date: Jan. 13, 2012, Application No. PCT/US2011/036882, Filed Date: May 17, 2011, pp. 9.

* cited by examiner

EMBEDDED SEARCH BAR

BACKGROUND

A user may enter a search query via a computing device executing a browser. The computing device may forward the search query to a remotely-located search engine. The search engine may return, to the computing device, a search results page in which all content is related to the provided search query. The computing device may then display at least a portion of the search results page on a display screen. Currently, search engines do not provide a way to expose, to the user, content unrelated to the entered search query, such as, for example, breaking news or other non-query-related content.

User interface (UI) components for use with existing search engines are controlled by search service providers. As a result, third party software developers have no way to integrate their applications with existing search engines. In addition, search engines traditionally rely on a pull model, in which users proactively search for information. The search engines do not provide a way to push, to a user, contextual information that may be helpful to a current search task being performed by the user. As a result, the current search task may be more difficult and time consuming for the user who is unaware of the helpful contextual information.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, an embedded search bar is provided for use with a browser executing on a computing device. The embedded search bar may be an open and extensible application container. The browser may load executable code for the embedded search bar from a website or from a remote computing device, such as, for example, a server or other computing device. The website may be a third-party website, a website related to a search engine, or another website. The executable code may be embedded within a webpage of the website. In some embodiments, the executable code may be embedded within search results provided to the browser as a webpage. When the executable code is embedded in a webpage, the browser may a load the executable code while loading the webpage. After loading the executable code, the browser may execute the executable code, thereby causing the embedded search bar to be displayed at a fixed position of a display screen of the computing device.

In various embodiments, a layout of the embedded search bar may be configurable. For example, information may be included in a manifest, which the browser may load from a remote source, such as, a remotely-located computing device or server, and may include a layout for representations of applications to be displayed within the embedded search bar, as well as a layout of results of executing an application associated with the embedded search bar.

The embedded search bar may include representations of content-driven applications and utility applications. The content-driven applications and the utility applications may interact with the embedded search bar via a set of public application program interfaces (APIs). The content-driven applications may automatically monitor search queries and may provide information to the embedded search bar, via the set of public APIs, for display within the embedded search bar. In some embodiments, a utility application may be executed when a user selects a representation of the utility application appearing within the embedded search bar.

The embedded search bar may include a search window for inputting a search query for a search to be performed over a particular website by a search engine. The website may be a third-party website or a website of a search provider.

DRAWINGS

In order to describe the manner in which the above-recited and other advantages and features can be obtained, a more particular description is discussed below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
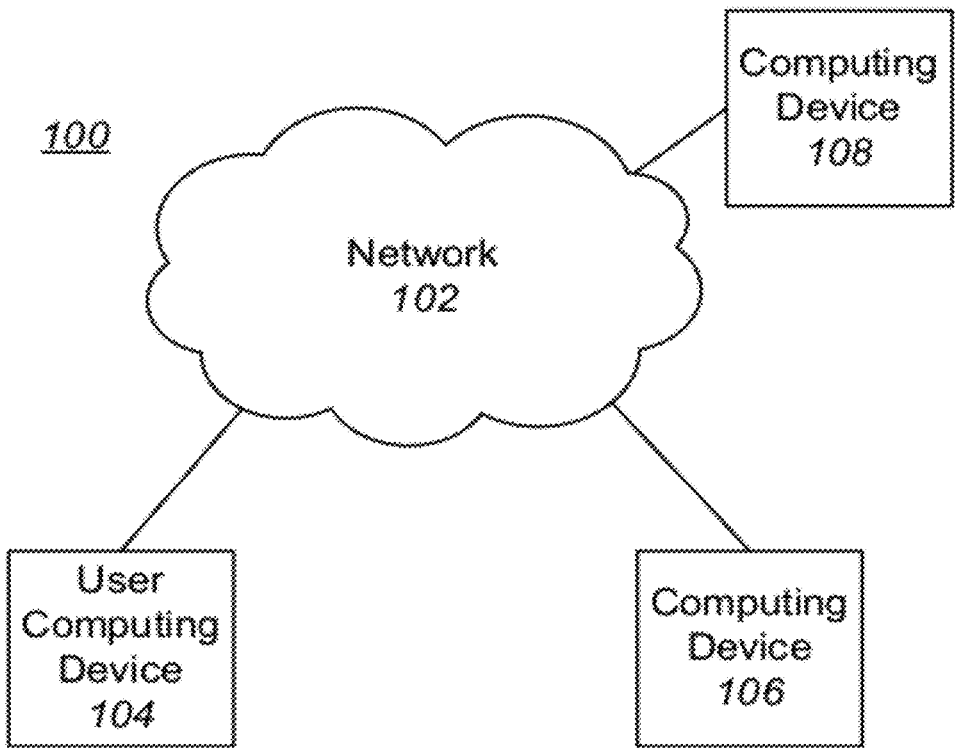
FIG. 1 illustrates an exemplary operating environment for embodiments consistent with the subject matter of this disclosure.

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

In embodiments consistent with the subject matter of this disclosure, a set of public application program interfaces (APIs) is provided to permit applications developed by third parties, as well as applications developed by others, to interface with an embedded search bar. The embedded search bar is an open and extensible search application platform. As a result, search applications that use the embedded search bar may easily be developed and may interact with search queries and search results to bring more value to users.

In a first embodiment, embedded search bar code may be embedded in a home page of a search engine, a search result page, or any other webpage. When a browser, executing on a computing device, loads a page including the embedded search bar code, the embedded search bar code may be executed, thereby causing the embedded search bar to be displayed at a particular portion of a display screen of the computing device. The computing device may create the embedded search bar, which is an application container. In some embodiments, the created embedded search bar may be displayed in a horizontal orientation at a fixed portion of a display screen, such as, for example, a bottom portion of a display screen. Regardless of scrolling of a displayed webpage, the embedded search bar may remain in a fixed position with respect to the display screen. In other embodiments, the created embedded search bar may be displayed at a top portion or other portion of the display screen. In some embodiments, instead of being displayed in a horizontal orientation, the created embedded search bar may be displayed in a vertical orientation, a diagonal orientation, or in another orientation.

In a second embodiment, the embedded search bar code may be embedded in a third-party website, such that when a browser loads a webpage from the third party website, the embedded search bar code is loaded with the webpage and displayed at a particular portion of a display screen of a computing device. When a user enters a query via the embedded search bar, the executing embedded search bar code may provide the query to a search engine and may inform the search engine to perform the query over the third party website. In variations of the second embodiment, the executing embedded search bar code may inform the search engine to perform the query over another website, such as, for example, a different third-party website.

In a third embodiment, a user of a computing device may request, via a user interface, that the embedded search bar code be loaded and executed by a browser independently from a loaded and displayed webpage.

Exemplary Operating Environment

FIG. 1 illustrates an exemplary operating environment 100 in which embodiments consistent with the subject matter of this disclosure may be implemented. Exemplary operating environment 100 may include a network 102, a user computing device 104, and computing devices 106, 108.

Network 102 may be a single network or a combination of multiple networks including, but not limited to, the Internet. Network 102 may include a wired network, a wireless network, a packet-switching network, a frame-relay network, a combination of networks, and/or other types of networks.

User computing device 104 may be connected to network 102, may execute a browser application and may communicate with other computing devices via network 102. Computing devices 106, 107 may be connected to network 102 and may be capable of communicating with user computing device 104, as well as other computing devices, via network 102.

Operating environment 100 is only exemplary. Other operating environments may include more than one user computing device 104 and fewer or more computing devices 106, 108.

Exemplary Computing Device

Figure 2:
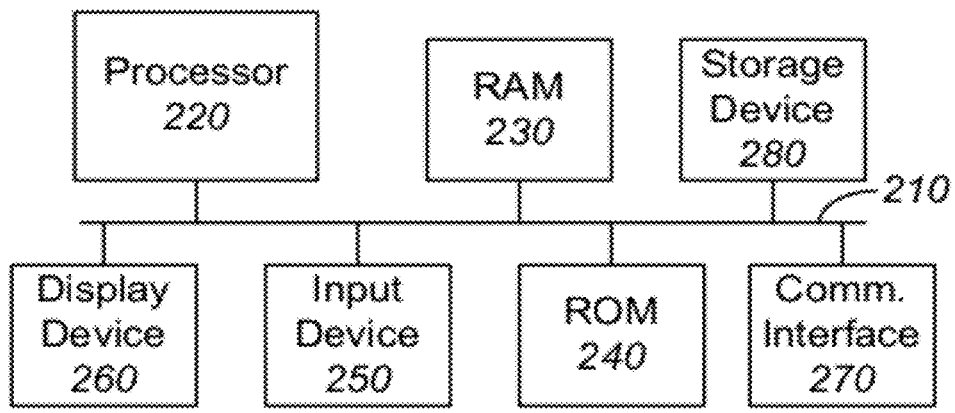
FIG. 2 is a block diagram of an exemplary processing device, which may be used to implement embodiments consistent with subject matter of this disclosure.

FIG. 2 is a diagram of exemplary hardware included in computing device 200, which may be used to implement user computing device 104 and computing devices 106, 108 in embodiments consistent with the subject matter of this disclosure. Computing device 200 may be a personal computer (PC), a portable computing device, or another type of computing device. Computing device 200 may include a bus 210, a processor 220, a random access memory (RAM) 230, a read only memory (ROM) 240, an input device 250, a display device 260, a communication interface 270, and a storage device 280. Bus 210 may connect processor 220, RAM 230, ROM 240, input device 250, display device 260, communication interface 270, and storage device 280.

Processor 220 may include one or more conventional processors that interpret and execute instructions. A memory may include RAM 230, ROM 240, and/or another type of dynamic or static storage device that stores information and instructions for execution by processor 220. RAM 230, or another type of dynamic storage device, may store instructions as well as temporary variables or other intermediate information used during execution of instructions by processor 220. ROM 240, or another type of static storage device, may store static information and instructions for processor 220.

Input device 250 may include a keyboard, a pointing device, an electronic pen, a touchscreen, or other device for providing input. Display device 260 may include a display monitor with a display screen, upon which information may be displayed.

Communication interface 270 may transmit information to and receive information from other computing devices via a network. Communication interface 270 may communicate via the network either wirelessly or via a wired connection.

Storage device 280 includes a non-transient medium for storing information. Processor 220 may read information from the non-transient medium and/or may write information to the non-transient medium. The non-transient medium may include one or more magnetic disks, optical disks, flash RAM, or other type of non-transient medium.

In some embodiments, computing device 106 or computing device 108 may be a server that provides a search service. In such a case, computing device 106 or computing device 108 may be implemented using multiple computing devices 200 working together as a server farm. At least some computing devices 200 within the server farm may not include display device 260 and/or input device 250.

Computing device 200 may perform functions in response to processor 220 executing sequences of instructions contained in a non-transient machine-readable medium, such as, for example, RAM 230, ROM 240, storage device 280 or other non-transient medium. Such instructions may be read into RAM 230 from another non-transient machine-readable medium or from a separate device via communication interface 270.

Embodiments

Figure 3:
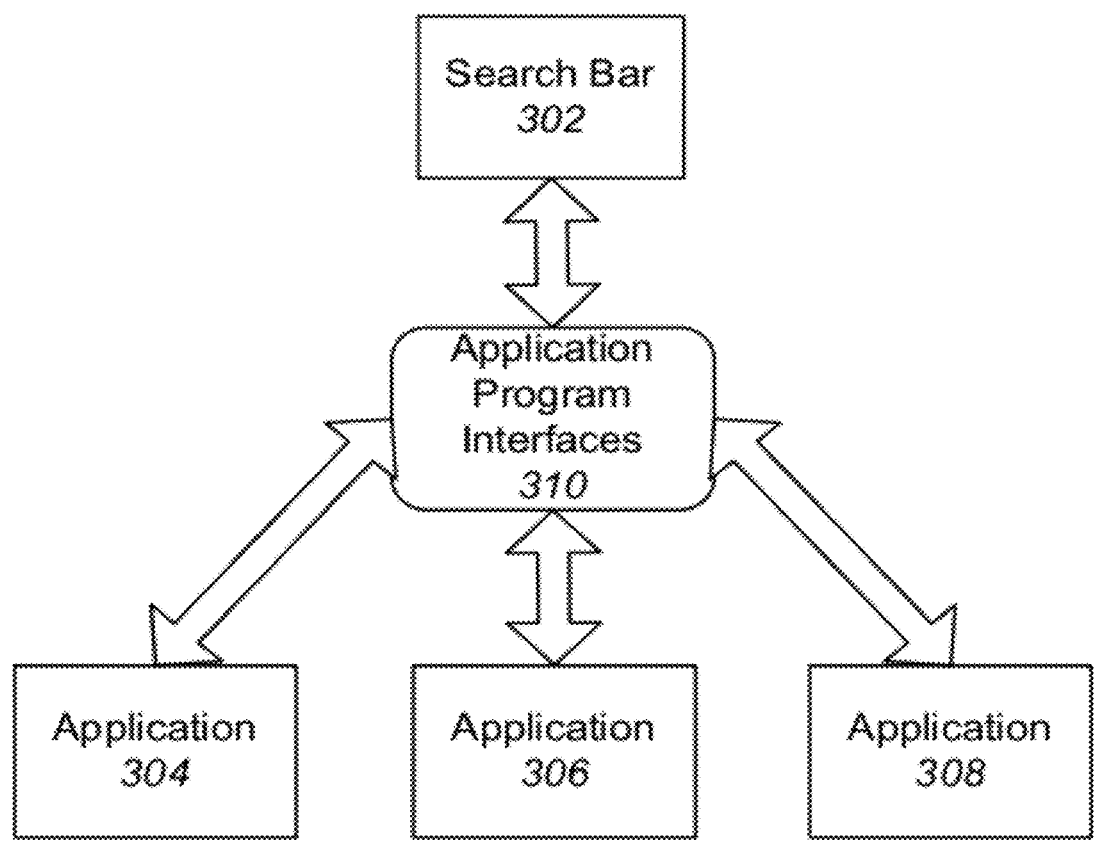
FIG. 3 illustrates applications interacting with an embedded search bar via a set of public application program interfaces.

FIG. 3 illustrates exemplary interactions among an embedded search bar 302 consistent with the subject matter of this disclosure and a number of applications 304, 306, 308. In various embodiments, embedded search bar 302 may be an application container. Any of applications 304, 306, 308 may be search applications. Each of applications 304, 306, 308 may interact with embedded search bar 302 via a set of public application program interfaces (APIs) 310. For example, an application from one of applications 304, 306, 308 may request information from embedded search bar 302 via set of public APIs 310. Similarly, the one of applications 304, 306, 308 may provide information to embedded search bar 302 via set of public APIs 310. Embedded search bar 302 may receive information via set of public APIs 310 from the one of applications 304, 306, 308 and may display the received information within embedded search bar 302.

Figure 4:
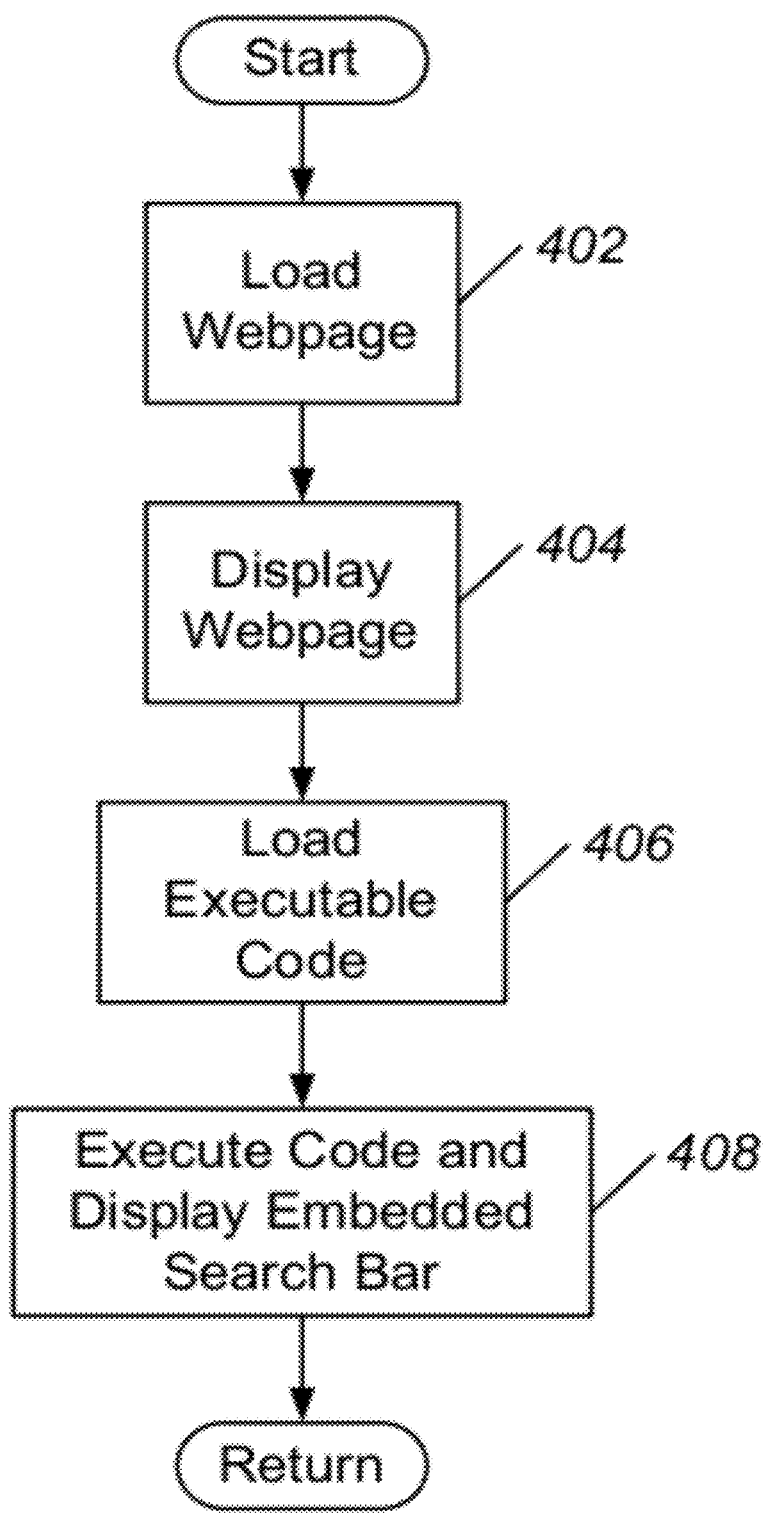
FIG. 4 is a flowchart of an exemplary process for loading and displaying a webpage, loading executable code for an embedded search bar, and executing and displaying the embedded search bar in an embodiment consistent with the subject matter of this disclosure.

FIG. 4 is a flowchart that illustrates exemplary processing in an embodiment. The processing may begin with a browser executing in a user computing device, such as, for example, user computing device 104, loading a webpage (act 402). The browser may then display at least a portion of the webpage on a display screen of a display device of the user computing device (act 404).

The browser may load executable code for an embedded search bar (act 406). In some embodiments, the executable code may be included within the webpage or within search results provided by a search engine. The webpage may be a home webpage of a search engine, a webpage of a third-party website, or other webpage. In another embodiment, the executable code for the embedded search bar may be loaded from a remote computing device by the browser when a user indicates a desire to load the executable code via a user interface of the browser.

The browser may then execute the loaded executable code, thereby causing the embedded search bar to be displayed at a fixed portion of a display screen of the user computing device (act 408).

Figure 5:
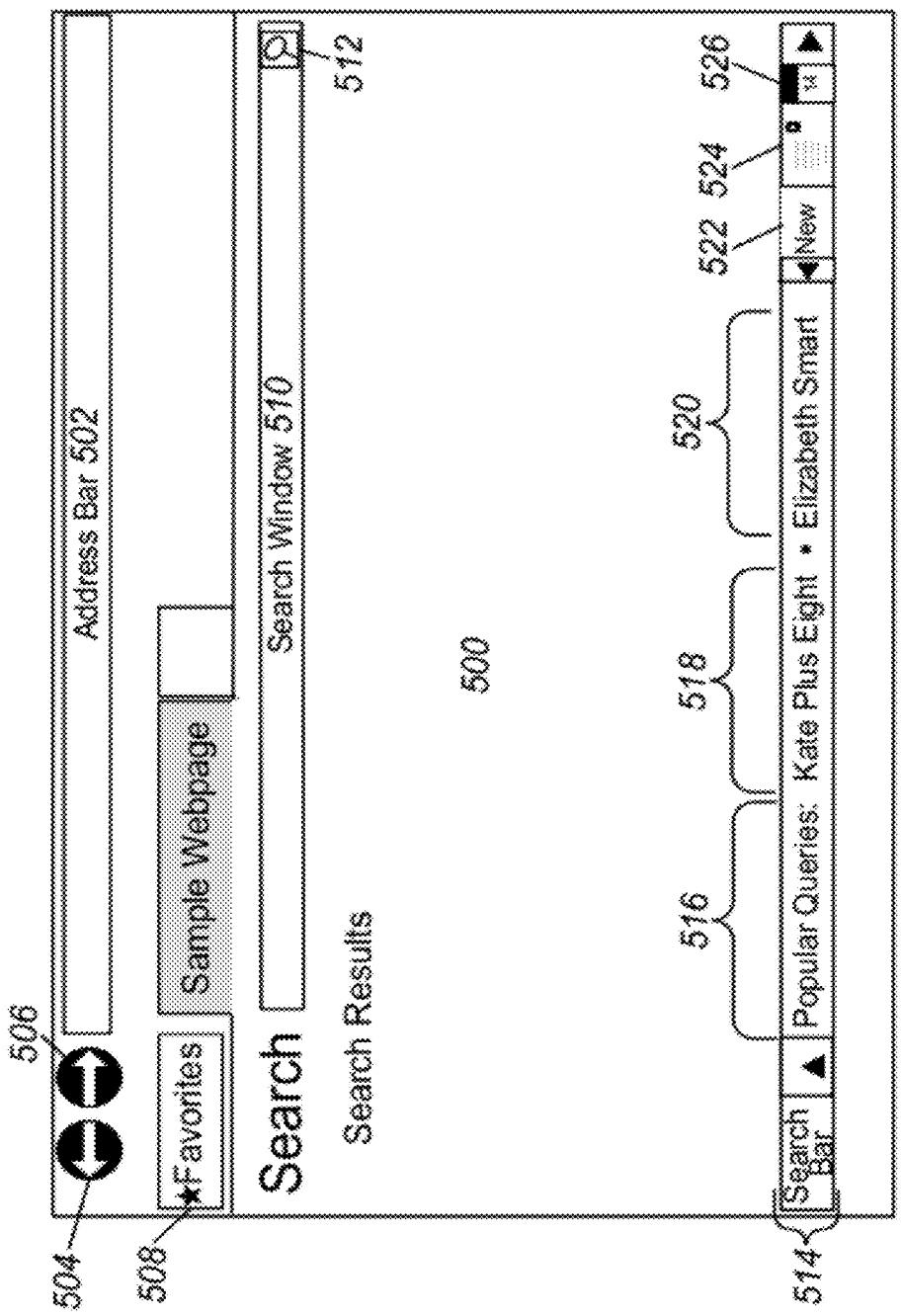
FIGS. 5-9 illustrate exemplary display screens having displayed thereon an embedded search bar consistent with the subject matter of this disclosure.

FIG. 5 illustrates an exemplary webpage 500 which may be displayed on a display screen by a browser executing on a computing device. In this example, exemplary webpage 500 is a webpage of search results. Search window 510 may be a window for entering a search query. After entering the search query, a user may select a search control 512 to request a search. The user may select displayed items or controls by hovering over and clicking on the item or control with a pointing device, by touching a touch screen with a finger, a stylus, or a user's own finger, or via other methods. Address window 502 may be a window for entering an address or uniform resource locator (URL) of a webpage or website. Back control 504 and forward control 506 may be selected by a user to display a previous webpage and a next webpage, respectively, within a chain of webpages. Favorites control 508 may be selected by the user to display a list of favorites or bookmarks, which may point to various webpages or websites. Selecting a bookmark or favorite from the list may cause the browser to request, load and display a webpage corresponding to the bookmark or favorite. An exemplary embedded search bar 514 is displayed at a fixed portion of a display screen which may display a webpage, such as, for example, webpage 500.

FIG. 5 illustrates embedded search bar 514 as being displayed as a horizontal embedded search bar (in a horizontal orientation with respect to the display screen) at a bottom portion of the display screen. However, in another embodiment, embedded search bar 514 may be displayed as a vertical embedded search bar (in a vertical orientation with respect to the display screen), or may be displayed in another orientation with respect to the display screen. Further, embedded search bar 514 may be displayed at another portion of the display screen instead of the bottom portion of the display screen. For example, embedded search bar 514 may be displayed at a top portion of the display screen, at a right side portion of the display screen, at a left side portion of the display screen, or at any other portion of the display screen.

Embedded search bar 514 may include, or be a container for, a number of applications, each of which may be a content-driven application or a utility application. An example of a content-driven application included in embedded search bar 514 is "popular queries" application 516, a representation of which may be included in the embedded search bar 514. Application 516 may interface with embedded search bar 514 via a set of APIs, as previously discussed, to request popular queries.

After receiving the request from application 516, embedded search bar 514 may send the request to a search engine for information regarding popular queries. The search engine may provide the information regarding poplar queries to embedded search bar 514, which may then pass the information to application 516 via the set of APIs. Application 516 may then select several of the most popular queries and may provide the selected most popular queries to embedded search bar 514 via the set of APIs. Embedded search bar 514 may then display the selected most popular queries within embedded search bar 514, as indicated by popular queries 518 and popular query 520.

Application 516 may execute automatically to periodically determine if the information regarding popular queries has changed. If the information has changed, application 516 may provide a selection of newest most popular queries to embedded search bar 514, via the set of APIs, to be displayed on the display screen within embedded search bar 514.

Although FIG. 5 illustrates application 516 as being an application for obtaining and displaying information regarding most popular queries, in other embodiments, an application may obtain and cause to be displayed another type of information. The type of information to be obtained and displayed may be limited only by an imagination of an application developer.

Utility applications may be represented within embedded search bar 514 by controls 522, 524 and 526. Utility applications will be discussed at a later point in this application. Although, embedded search bar 514 shows only three utility applications, another embedded search bar may include fewer or more utility applications.

Figure 6:
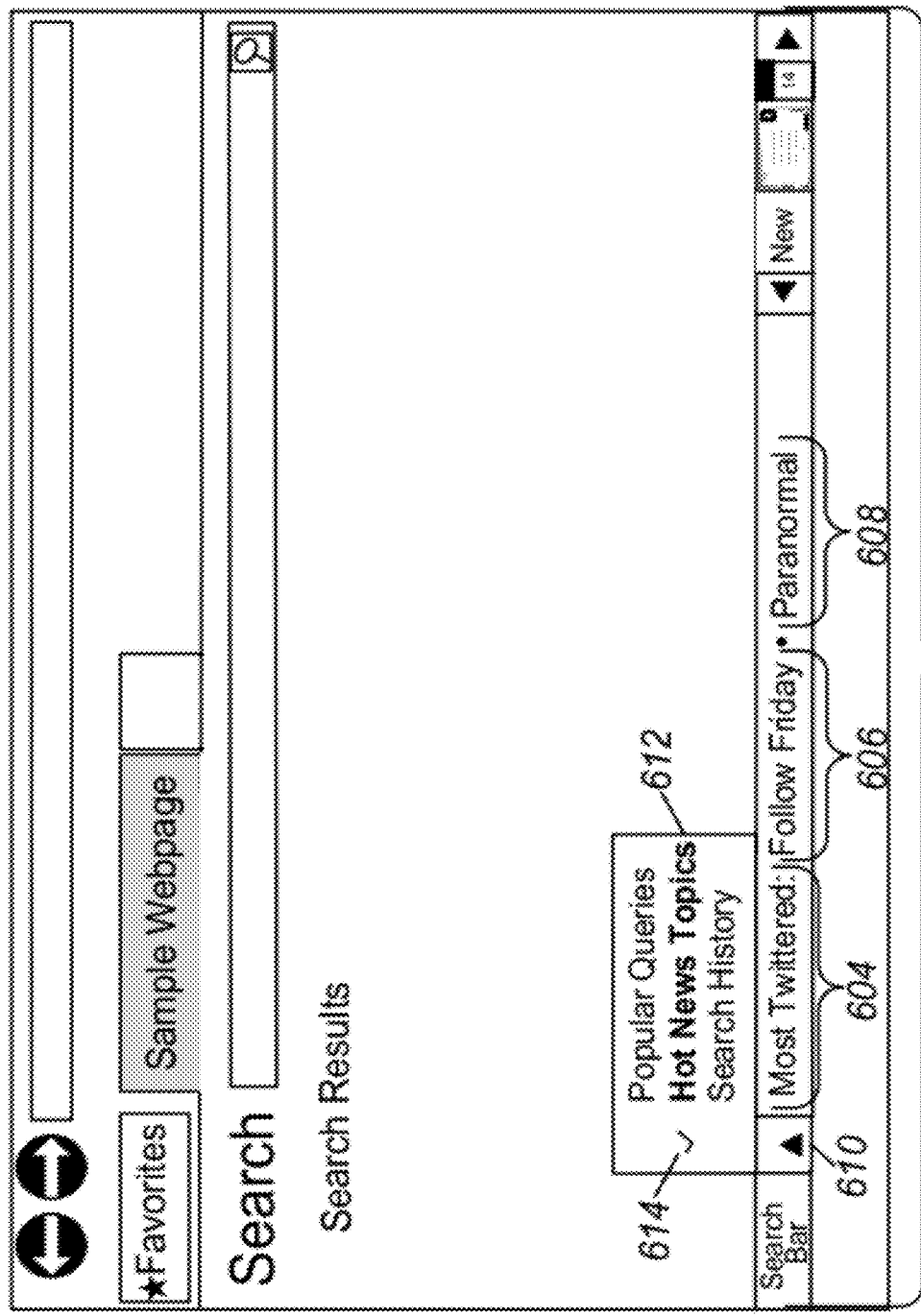

FIG. 6 illustrates an exemplary webpage being displayed on a display screen, by a browser, along with an exemplary embedded search bar 602. Embedded search bar 602 indicates that a content-driven application 604, "most twittered" is executing and results of executing "most twittered" application 604 is twittered subject 606, "Follow Friday", and twittered subject 608, "Paranormal".

Similar to application 516 of FIG. 5, application 604 may interface with embedded search bar 602 via the set of APIs, as previously discussed, to request information regarding most twittered subjects. Embedded search bar 602 may send a request to a search engine for information regarding the most twittered subjects. The search engine may provide the information regarding the most twittered subjects to embedded search bar 602, which then may pass the information to application 604 via the set of APIs. Application 604 may then select several of the most twittered subjects and may provide the selected most twittered subjects to embedded search bar 602 via the set of APIs. Embedded search bar 602 may then display the selected most twittered subjects within embedded search bar 602, as indicated by twittered subjects 606 and 608.

As shown in FIG. 6, a user may select control 610 to display names or other indications of one or more other content-driven applications. In this example, the user selected an application 612, "Hot News Topics", as indicated by checkmark 614. In other embodiments, a selected application may be indicated by highlighting the selected application, blinking the selected application, or indicating the selected application by other methods. After application 612 is selected, application 604, shown within embedded search bar 602, may be changed to application 612 and subjects found as a result of executing application 612, "Hot News Topics", may replace twittered subjects 606 and 608 within embedded search bar 602.

Although FIG. 6 shows only two subjects 606, 608 being displayed within embedded search bar 602, in another embodiment, a different number of subjects may be displayed within embedded search bar 514. Further, in another embodiment, the user may be provided with a different number of content-driven applications from which to select, instead of three applications as shown in FIG. 6.

Figure 7:
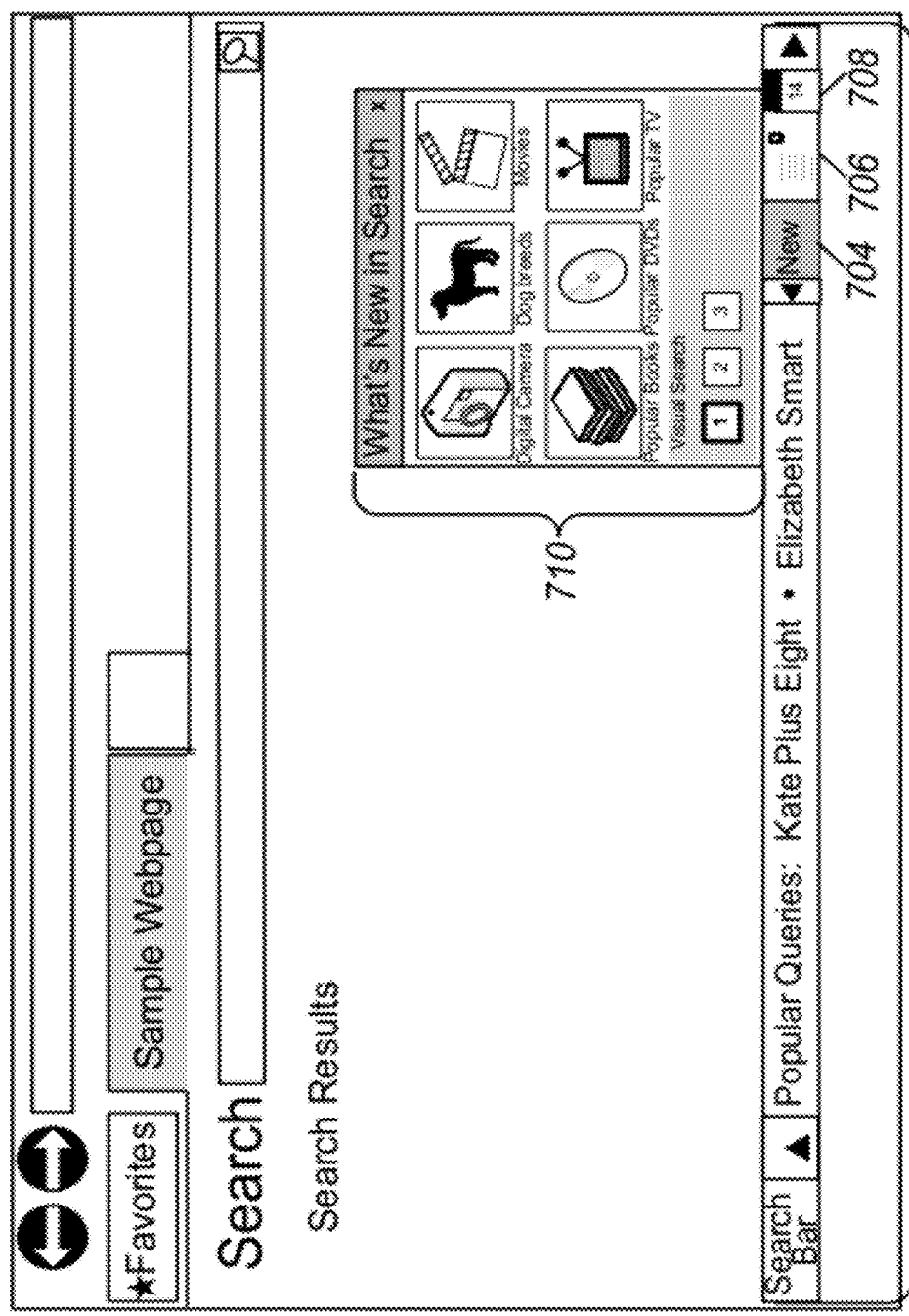

FIG. 7 illustrates another exemplary display screen displaying a webpage and an embedded search bar 702. Items 704, 706 and 708 within embedded search bar 702 are utility applications. Utility applications may be executed when a user selects a representation of the utility application in an embedded search bar, such as, for example, item 704, 706 or 708. In FIG. 7, item 704 represents an application for displaying new items found by search engine, item 706 represents an e-mail application, and item 708 represents a calendar application. In other embodiments, other utility applications may be represented within embedded search bar 702.

In the example shown in FIG. 7, a user selected item 704. The application corresponding to item 704 may obtain and provide information regarding new items to embedded search bar 702, which may then display the information, as shown in window 710. In window 710, new items may be displayed in two rows, each of the rows having three columns. A layout of results produced by a utility application, such as shown in, for example, window 710, may be specified in a manifest, which may be provided to the computing device executing the browser from another computing device, such as, for example, a remotely-located server or other computing device. The manifest may also include information for embedded search bar 702 to create a number of search applications and for displaying the search applications accordingly within embedded search bar 702. Thus, an application developer could specify that results of the utility application are to be presented in any one of a number of layouts, such as, for example, three rows by two columns, or another layout, and could specify a particular appearance of representations of content-driven applications shown in an embedded search bar, as well as positions of the content-driven applications within the embedded search bar.

Figure 8:
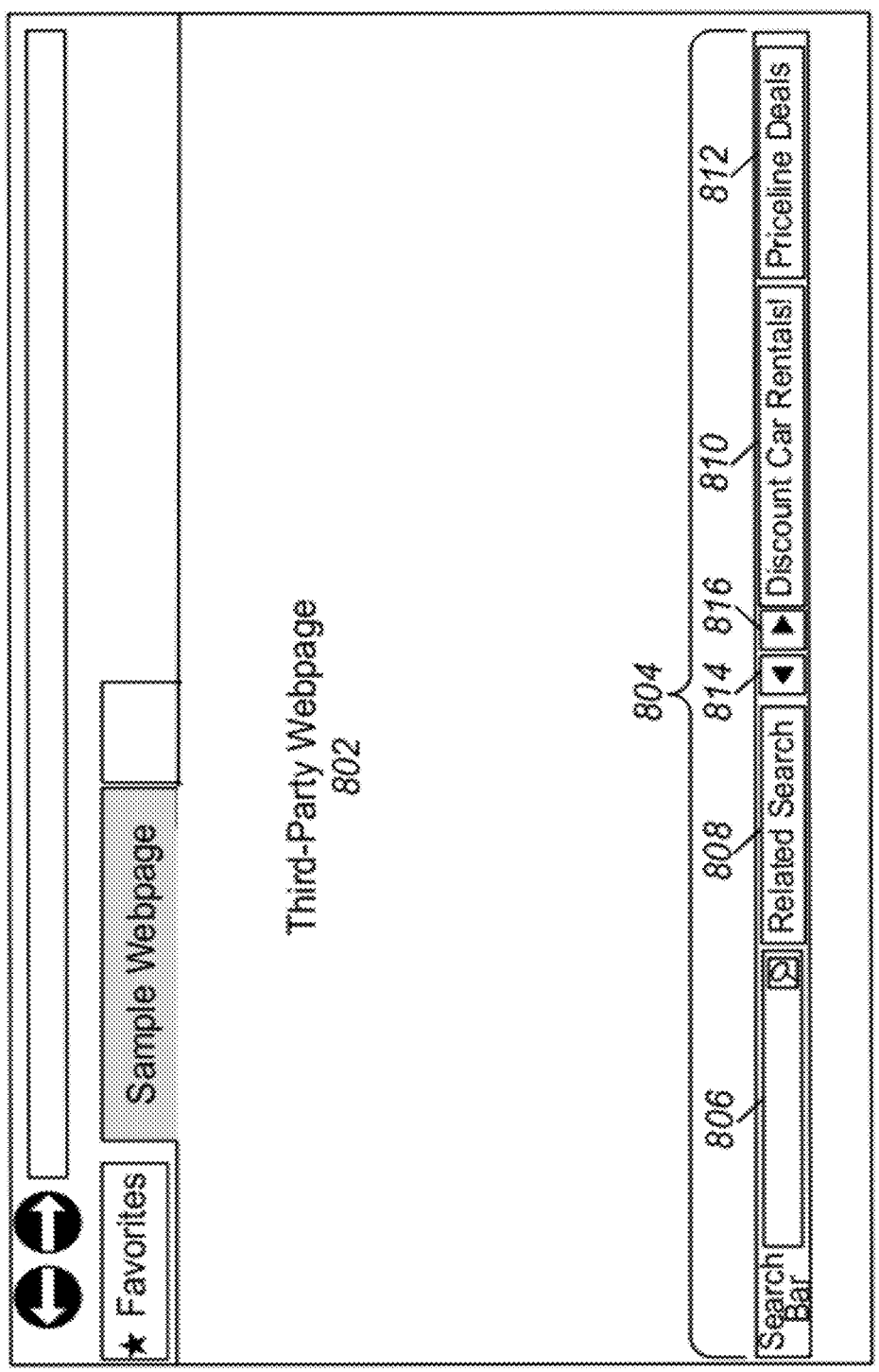

FIG. 8 shows a display screen upon which a webpage 802 of a third party is displayed as well as an embedded search bar 804, which is displayed at a fixed portion of the display screen. In FIG. 8, embedded search bar 804 is displayed at a bottom portion of the display screen and remains at the bottom portion of the display screen even when the displayed webpage 802 is scrolled.

Embedded search bar 804 includes an embedded search window 806. After a user enters a search query via embedded search window 806, in this embodiment, embedded search bar 804 may provide the search query to a remotely-located search engine, via a network, and may indicate to the remotely-located search engine that a search is to be performed over a website of the third party. If the website of the third party is indexed by the search engine, then the search engine may conduct a search using the search query over the website of the third party. Results of the search may be returned to the browser and presented as a displayed webpage on the display screen.

If the user selects a related search button 808 within embedded search bar 804, an application corresponding to related search button 808 may analyze a search query entered via search window 806 and may display several suggestions via a new window associated with embedded search bar 804. If the user selects one of the displayed suggestions, then a search query corresponding to the selected displayed suggestion may be sent to the remotely-located search engine, along with an indication of a website of the third party. The search engine may then conduct a search, using the selected displayed suggestion, and may provide the results to the browser executing on the computing device, which may then present the results as a webpage on the display screen.

Another application associated with embedded search bar 804 may present advertising, as shown by items 810 and 812 of embedded search bar 804. If the user is interested in a product being advertised, then the user may select an item within embedded search bar 804, such as, for example, items 810 or 812, which, in one embodiment, may cause a webpage to be displayed regarding the advertised product. The products being advertised, within embedded search bar 804, by associated applications may be related to search queries entered via search window 806 in some embodiments. In other embodiments, the products being advertised may not be related to the search queries entered via search window 806. When a number of advertisements available for displaying within an embedded search bar 804 exceeds an amount of space available, a user may select item 814 to display advertisements preceding currently displayed advertisements within embedded search bar 804, and the user may select the item 816 to display advertisements following the currently displayed advertisements within embedded search bar 804.

Figure 9:
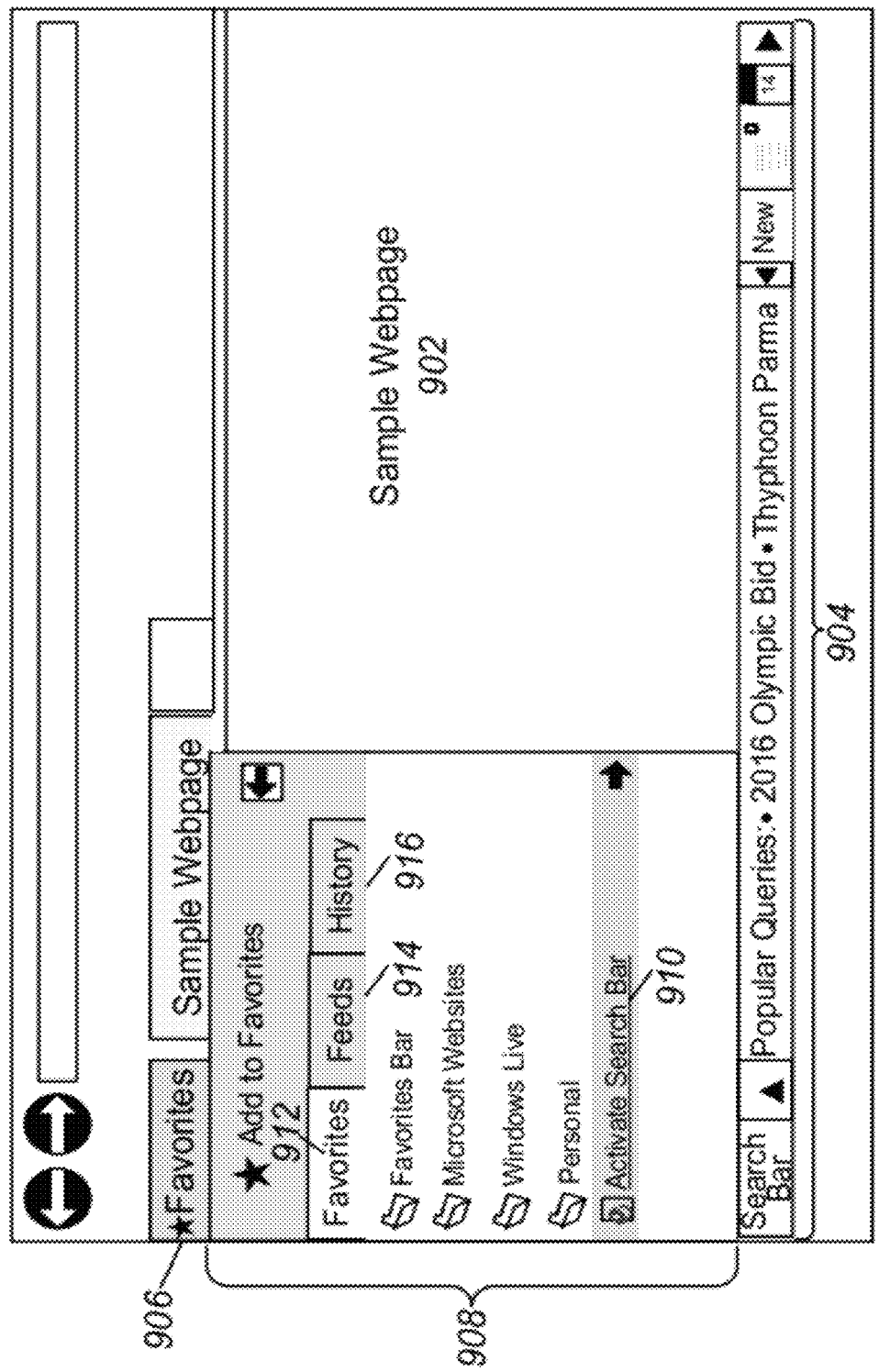

In one embodiment, an embedded search bar may be activated, via a browser executing on a computing device, regardless of a webpage being displayed by the browser on a display screen. For example, FIG. 9 illustrates a displayed sample webpage 902 on a display screen along with embedded search bar 904. A user may select favorites button 906 displayed on the display screen to cause a window 908 to be displayed. Window 908 may include a number of tabs, such as, for example, a favorites tab 912, a feeds tab 914, and a history tab 916. In FIG. 9, favorites tab 912 is active within window 908 and a number of favorites and an activate search bar control 910 may be displayed. When the user selects activate search bar control 910, the browser executing on the computing device may send a request for executable code associated with embedded search bar 904 to a remotely-located computing device, such as, for example, a server or other computing device. After receiving the executable code, the browser may execute the executable code and may then display embedded search bar 904 on the display screen regardless of which webpage is being displayed on the display screen by the browser.

Conclusion

Various embodiments were described in which an embedded search bar is provided as an open and extensible search application platform. A layout of representations of content-driven applications and utility applications to be displayed within the embedded search bar may be specified within a manifest. The manifest may further include one or more layouts for results of executing one or more of the utility applications. Functions provided by the applications may be limited only by imaginations of application developers.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Other configurations of the described embodiments are part of the scope of this disclosure. For example, in other embodiments, an order of acts performed by a process, such as the processes illustrated in FIG. 4 may be different and/or may include additional or other acts.

Accordingly, the appended claims and their legal equivalents define embodiments, rather than any specific examples given.

We claim as our invention:

1. A method for use in a computing device, the method comprising:
   loading, via a browser executing on the computing device, a webpage from a particular address over a network;
   displaying, by the computing device, the webpage on a display screen;
   loading, by the computing device, executable code from a second computing device via the network;
   loading, by the computing device, a manifest from a remote source, the manifest including information regarding a layout for representations of applications to be displayed within an embedded search bar; and
   executing the code, by the computing device, to cause the embedded search bar to be displayed at a first portion of the display screen displaying the webpage, the embedded search bar being an open and extensible search application platform having a set of public application program interfaces and at least one application associated therewith for presenting non-query related results, the at least one application interfacing with the embedded search bar via the set of public application program interfaces.

2. The method of claim 1, wherein the executable code is embedded within content for the webpage.

3. The method of claim 2, wherein the webpage is a home page of a search engine.

4. The method of claim 1, wherein:
   one of the at least one application is a content-related application, the content-related application being for pulling content unrelated to queries made by a user of the computing device.

5. The method of claim 1, further comprising:
   executing, on the computing device, at least one second application that interfaces with the embedded search bar via the set of application program interfaces, interacts with search queries, makes queries related to, but different from, the search queries and provides a subject of results of the made related queries for presentation in the embedded search bar.

6. The method of claim 1, wherein:
   the embedded search bar includes at least one utility application which is executed when selected by a user.

7. The method of claim 6, wherein:
   a layout of results produced by the at least one application is specified in the manifest.

8. At least one non-transient machine-readable medium having instructions for at least one processor of a computing device, the non-transient machine-readable medium comprising:
   instructions for displaying an embedded search bar at a first portion of a display screen of the computing device while the display screen displays a webpage via a browser executing on the computing device, the embedded search bar being an open and extensible application platform having a set of public application program interfaces configured to interface with at least one application; and
   instructions for loading a manifest from a remote source, the manifest including information regarding a layout of representations of applications to be displayed within the embedded search bar.

9. The at least one non-transient machine-readable medium of claim 8, further comprising:
   instructions for keeping the embedded search bar positioned at the first portion of the display screen regardless of any scrolling with respect to the webpage displayed by the browser.

10. The at least one non-transient machine-readable medium of claim 9, wherein the first portion of the display screen is a bottom portion of the display screen.

11. The at least one non-transient machine-readable medium of claim 8, further comprising:
    instructions for executing a first application which is configured to use the set of public application program interfaces to interface with the embedded search bar, the first application further being configured to monitor queries made by a user of the computing device and provide suggestions for queries.

12. The at least one non-transient machine-readable medium of claim 8, further comprising:
    instructions for executing a first application which is configured to obtain non-user-query related information and provide information concerning the obtained non-user-query related information within the embedded search bar.

13. The at least one non-transient machine-readable medium of claim 8, further comprising:
    instructions for executing a utility application when a user selects a representation of the utility application displayed within the embedded search bar.

14. The at least one non-transient machine-readable medium of claim 13, wherein a layout of results of the at least one application represented in the embedded search bar is specified in the manifest.

15. A computing device comprising:
    at least one processor;
    a memory connected to the at least one processor; and
    a communications interface connected to the at least one processor and the memory, the memory further including instructions for the at least one processor, the instructions comprising:
    instructions for displaying an embedded search bar at a fixed position of a display screen,
    instructions for permitting at least one third party application to interface with the embedded search bar via a set of public application program interfaces, and
    instructions for loading a manifest from a remote source, the manifest including information regarding a layout of a representation of the at least one third party application to be displayed within the embedded search bar.

16. The computing device of claim 15, wherein the memory further comprises:
    instructions for the embedded search bar to include a search window for inputting at least one search query,
    instructions for an application to receive the inputted at least one search query via the set of public application program interfaces,
    instructions for the application to provide the at least one search query to a search engine for performing a search, and
    instructions for displaying results of the search received from the search engine.

17. The computing device of claim 16, wherein the memory further comprises:
    instructions for the application to inform the search engine to perform the search over a particular website.

18. The computing device of claim 15, wherein the memory further comprises:
    instructions for executing an application which interfaces with the embedded search bar via the set of public application program interfaces, the application including instructions for obtaining information and displaying the information within the embedded search bar.

19. The computing device of claim 18, wherein the application further includes:

instructions for monitoring search queries input to the computing device, instructions for determining one or more related queries with respect to the monitored search queries, and instructions for presenting information regarding the one or more related queries as one or more suggestions within the embedded search bar.

20. The computing device of claim 15, wherein the at least one third party application is a utility application which is executed only after a user selects, via an input device of the computing device, a representation of the utility application displayed within the embedded search bar.

* * * * *